United States Patent
Harshbarger et al.

(10) Patent No.: US 9,162,089 B2
(45) Date of Patent: Oct. 20, 2015

(54) RESTRAINT AND EXTRACTION HARNESS WITH ASSOCIATED RELEASE MECHANISM

(75) Inventors: Joel Harshbarger, Palmetto, FL (US); Chris Motta, South Pasadena, FL (US); Kevin Holler, Belleair, FL (US); Justin Robinson, Parrish, FL (US)

(73) Assignee: Carleton Life Support Systems, Inc., Davenport, IA (US)

( * ) Notice: Subject to any disclaimer, the term of this patent is extended or adjusted under 35 U.S.C. 154(b) by 309 days.

(21) Appl. No.: 13/196,043

(22) Filed: Aug. 2, 2011

(65) Prior Publication Data
US 2012/0024627 A1    Feb. 2, 2012

Related U.S. Application Data

(60) Provisional application No. 61/369,945, filed on Aug. 2, 2010.

(51) Int. Cl.
*A62B 35/00* (2006.01)
*B64D 25/06* (2006.01)

(52) U.S. Cl.
CPC ............ *A62B 35/0006* (2013.01); *A62B 35/00* (2013.01); *B64D 25/06* (2013.01)

(58) Field of Classification Search
CPC .............. A62B 35/00; A62B 35/0006; A62B 35/0018; A62B 35/025; A62B 35/0037; A62B 35/0043; B64D 25/06
USPC ............... 2/102, 459, 460, 461, 94, 462, 463, 2/464, 2.5, 305, 310; 182/3
See application file for complete search history.

(56) References Cited

U.S. PATENT DOCUMENTS

| | | | | |
|---|---|---|---|---|
| 1,233,376 A * | 7/1917 | Link | ......................... | 294/82.33 |
| 3,757,893 A * | 9/1973 | Hobbs | ................. | 182/6 |
| 3,930,290 A * | 1/1976 | Mangels | ...................... | 114/108 |
| 3,973,643 A * | 8/1976 | Hutchinson | ..................... | 182/3 |
| 4,076,101 A * | 2/1978 | Himmelrich | ..................... | 182/3 |
| 4,093,293 A * | 6/1978 | Huggett | ..................... | 294/82.33 |
| 4,177,877 A * | 12/1979 | Gallinati | ......................... | 182/3 |
| 4,273,216 A * | 6/1981 | Weissmann | ..................... | 182/3 |
| 4,279,062 A * | 7/1981 | Boissonnet | ..................... | 24/305 |
| 4,406,348 A * | 9/1983 | Switlik, II | ........................ | 182/3 |
| 4,553,633 A * | 11/1985 | Armstrong et al. | ............... | 182/3 |
| 4,645,033 A * | 2/1987 | Oelschlager | ..................... | 182/6 |
| 5,012,964 A * | 5/1991 | Falletta et al. | ................ | 224/153 |
| 5,067,585 A * | 11/1991 | Bell | .................. | 182/7 |
| 5,107,956 A | 4/1992 | Constantinis et al. | | |
| 5,197,410 A * | 3/1993 | Wilson et al. | ................. | 119/776 |
| 5,203,829 A | 4/1993 | Fisk et al. | | |
| RE34,351 E * | 8/1993 | Lacey | ......................... | 119/776 |
| 5,487,444 A * | 1/1996 | Dennington | ..................... | 182/6 |
| 5,544,363 A * | 8/1996 | McCue et al. | .................... | 2/102 |
| 5,738,046 A * | 4/1998 | Williams et al. | .............. | 119/770 |
| 5,769,475 A * | 6/1998 | Tylaska | ......................... | 294/82.2 |
| 5,784,763 A * | 7/1998 | Cassidy | ......................... | 24/130 |

(Continued)

*Primary Examiner* — Alissa L Hoey
(74) *Attorney, Agent, or Firm* — Woods Oviatt Gilman LLP; Katherine H. McGuire, Esq.

(57) ABSTRACT

Disclosed is a harness system that can be used in both restraining and extracting a wearer. The harness takes the form of webbing that may be integrated into a crewmember worn vest. The webbing includes extraction loops for use in hoisting the crewmember and a release mechanism for releasably coupling the harness to an external restraint, such as an overhead reel. The system can be used within a vehicle, such as a land based vehicle, a water going vessel, or an aircraft.

6 Claims, 11 Drawing Sheets

(56) References Cited

U.S. PATENT DOCUMENTS

| | | | | |
|---|---|---|---|---|
| 5,881,487 | A * | 3/1999 | Chalker | 42/85 |
| 5,909,802 | A * | 6/1999 | Puco et al. | 2/102 |
| 5,970,517 | A * | 10/1999 | Jordan | 2/69 |
| 6,233,740 | B1 * | 5/2001 | Meyers et al. | 2/102 |
| 6,367,582 | B1 * | 4/2002 | Derby | 182/3 |
| 6,382,139 | B1 * | 5/2002 | Rhodes | 119/776 |
| 6,393,677 | B1 | 5/2002 | Anscher | |
| 6,487,725 | B1 * | 12/2002 | Jordan | 2/94 |
| 6,732,834 | B2 * | 5/2004 | Colorado | 182/6 |
| 6,769,137 | B2 | 8/2004 | D'Annunzio | |
| 6,832,417 | B1 * | 12/2004 | Choate | 24/600.1 |
| 6,896,291 | B1 * | 5/2005 | Peterson | 280/808 |
| 6,948,188 | B2 | 9/2005 | D'Annunzio | |
| 6,983,913 | B2 * | 1/2006 | Auvray | 244/151 A |
| 6,990,928 | B2 * | 1/2006 | Kurtgis | 119/770 |
| 7,020,897 | B2 | 4/2006 | Johnson | |
| 7,047,570 | B2 | 5/2006 | Johnson | |
| 7,086,091 | B2 * | 8/2006 | Jordan | 2/69 |
| 7,275,710 | B2 | 10/2007 | VanDruff et al. | |
| 7,448,116 | B1 * | 11/2008 | Howell | 24/614 |
| 7,481,399 | B2 * | 1/2009 | Nohren et al. | 244/122 R |
| 7,699,761 | B1 * | 4/2010 | Dieter et al. | 482/124 |
| 7,814,567 | B2 * | 10/2010 | Dovner et al. | 2/2.5 |
| 7,828,180 | B2 * | 11/2010 | Slesar | 224/257 |
| 7,917,967 | B2 * | 4/2011 | Osborne | 2/2.5 |
| 7,942,242 | B1 * | 5/2011 | O'Connor et al. | 182/70 |
| 7,979,917 | B2 * | 7/2011 | Osborne | 2/2.5 |
| 7,979,919 | B2 * | 7/2011 | Joran | 2/69 |
| 8,007,419 | B2 * | 8/2011 | Dieter et al. | 482/124 |
| 8,056,196 | B2 * | 11/2011 | Sample et al. | 24/601.5 |
| 8,066,161 | B2 * | 11/2011 | Green et al. | 224/157 |
| 8,074,326 | B2 * | 12/2011 | Slank | 24/165 |
| 8,087,102 | B2 * | 1/2012 | Kordecki | 2/462 |
| 8,201,271 | B2 * | 6/2012 | Dennis | 2/102 |
| 8,256,020 | B2 * | 9/2012 | Dovner et al. | 2/2.5 |
| 8,256,026 | B2 * | 9/2012 | Garrigos | 2/94 |
| 8,356,692 | B1 * | 1/2013 | Steck et al. | 182/3 |
| 8,370,962 | B2 * | 2/2013 | McBride et al. | 2/2.5 |
| 8,479,312 | B2 * | 7/2013 | Dovner et al. | 2/2.5 |
| 8,490,212 | B1 * | 7/2013 | Asher et al. | 2/2.5 |
| 8,499,362 | B2 * | 8/2013 | Dennis | 2/102 |
| 8,533,862 | B2 * | 9/2013 | Khandelwal | 2/2.5 |
| 2002/0175025 | A1 * | 11/2002 | Kurtgis | 182/3 |
| 2004/0140152 | A1 * | 7/2004 | Richardson | 182/3 |
| 2005/0005342 | A1 * | 1/2005 | Johnson | 2/102 |
| 2006/0113147 | A1 * | 6/2006 | Harris, Jr. | 182/3 |
| 2006/0163304 | A1 * | 7/2006 | Slesar | 224/601 |
| 2007/0107109 | A1 * | 5/2007 | Johnson | 2/102 |
| 2007/0295555 | A1 | 12/2007 | O'Rourke | |
| 2008/0235841 | A1 * | 10/2008 | McDunn et al. | 2/2.5 |
| 2008/0263737 | A1 * | 10/2008 | Parks et al. | 2/2.5 |
| 2009/0064400 | A1 * | 3/2009 | Garrigos | 2/458 |
| 2009/0071750 | A1 * | 3/2009 | Simard et al. | 182/5 |
| 2009/0211000 | A1 * | 8/2009 | Roux | 2/462 |
| 2009/0282595 | A1 * | 11/2009 | Branson et al. | 2/2.5 |
| 2009/0321550 | A1 | 12/2009 | Boyer et al. | |
| 2010/0005555 | A1 * | 1/2010 | Osborne | 2/2.5 |
| 2010/0071106 | A1 * | 3/2010 | Parks et al. | 2/2.5 |
| 2010/0163338 | A1 | 7/2010 | Wood | |
| 2010/0223705 | A1 * | 9/2010 | Osborne | 2/2.5 |
| 2010/0229357 | A1 * | 9/2010 | Sample et al. | 24/601.5 |
| 2010/0235957 | A1 * | 9/2010 | Dovner et al. | 2/2.5 |
| 2010/0300802 | A1 * | 12/2010 | Kopp | 182/3 |
| 2010/0313327 | A1 * | 12/2010 | Anscher | 2/102 |
| 2010/0313392 | A1 * | 12/2010 | Anscher | 24/616 |
| 2011/0023203 | A1 * | 2/2011 | Dovner et al. | 2/2.5 |
| 2011/0072546 | A1 * | 3/2011 | Taylor et al. | 2/2.5 |
| 2011/0072566 | A1 * | 3/2011 | Kovacevich et al. | 2/463 |
| 2011/0099776 | A1 * | 5/2011 | Anscher | 24/629 |
| 2011/0113520 | A1 * | 5/2011 | Dennis | 2/2.5 |
| 2011/0277212 | A1 * | 11/2011 | Jones | 2/102 |
| 2012/0000004 | A1 * | 1/2012 | Hellweg | 2/102 |
| 2012/0023638 | A1 * | 2/2012 | Leicester | 2/79 |
| 2012/0030852 | A1 * | 2/2012 | Anscher | 2/102 |
| 2012/0174286 | A1 * | 7/2012 | McBride et al. | 2/102 |
| 2013/0062144 | A1 * | 3/2013 | Fleming | 182/3 |

\* cited by examiner

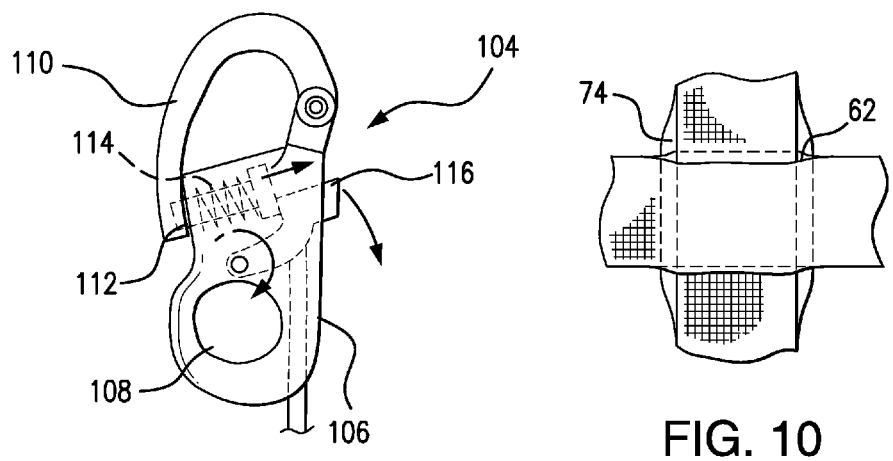
FIG. 8
FIG. 10
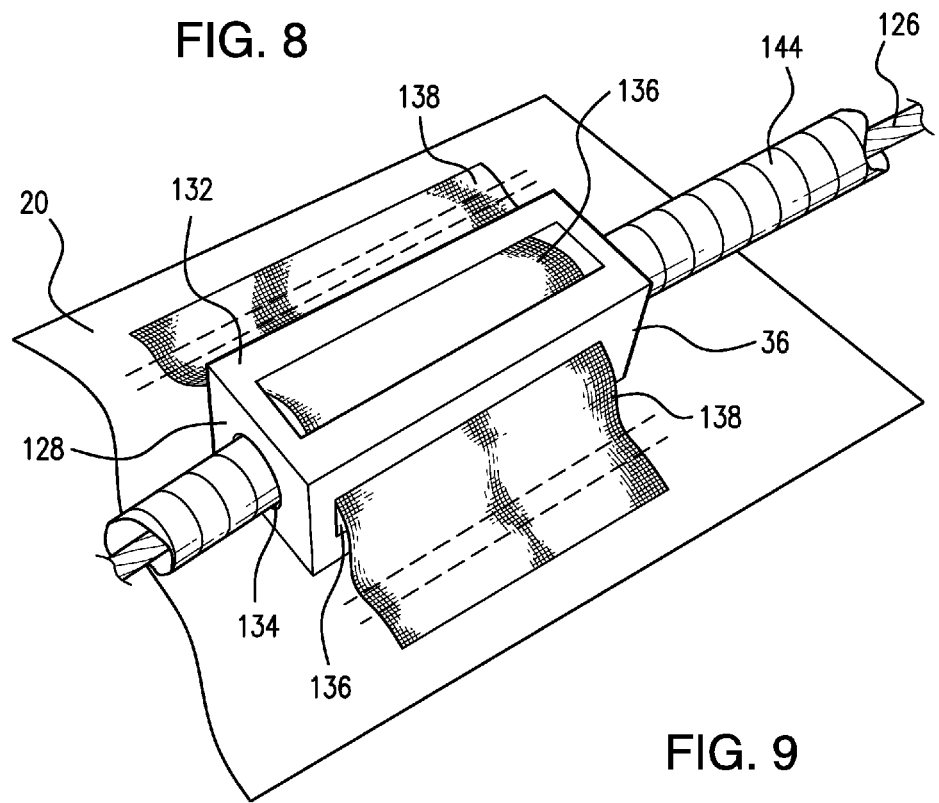
FIG. 9

RESTRAINT AND EXTRACTION HARNESS WITH ASSOCIATED RELEASE MECHANISM

RELATED APPLICATION DATA

This application claims priority to provisional application Ser. No. 61/369,945 filed on Aug. 2, 2010 and entitled "Vest Interface with Release Mechanism." The contents of this application are fully incorporated herein.

BACKGROUND OF THE INVENTION

1. Field of the Invention

The present disclosure relates to a harness system. More specifically, the disclosure relates to a harness that can be used to both restrain and extract a wearer. A release mechanism is also included for releasably coupling the harness to an external restraint system.

2. Description of the Background Art

External restraint systems for use within a vehicle are known in the art. These systems include a vest that is secured to the occupant. A tether is used to connect the vest to an overhead reel or to a fixed anchor point within the vehicle cabin. During normal vehicle movements, the webbing can be dispensed from the reel as needed to facilitate movement. However, an accelerometer within the reel locks the tether in the event of sudden or severe movements. In these situations, the user worn vest acts to restrain the occupant. In this manner, the vest protects the occupant from becoming injured or from falling out of the vehicle.

One such system is described in commonly owned U.S. Pat. No. 7,275,710 to Van Druff et al. Van Druff discloses an aircrew restraint system that includes a track and a trolley that runs along the track. The trolley includes an interlock pin that cooperates with interlock hooks spaced within the track. A tether connects an aircrew vest to an overhead retractor.

Although the Van Druff system is sufficient in many respects, it has two potential drawbacks. First, restraint systems such as the one disclosed by Van Druff lack a mechanism for quickly and easily detaching the vest from the overhead restraint system. Namely, a crewmember must reach behind their back in order to uncouple the tether from the restraint. The ability to detach the vest from the overhead restraint may be especially important in the event of a crash or water landing. The crewmember must also have the ability to be quickly and easily removed from the restraint in the event the crewmember is hanging or otherwise suspended from the restraint tether. These emergency situations require the restrained individual to be immediately separated from the restraint system to prevent bodily injury and/or allow egress from the vehicle.

Van Druff also lacks an extraction or hoisting harness. Hoisting harnesses include a length of webbing that encircles a person's torso and/or legs. Hoisting harnesses must sufficiently engage a person's body to evenly distribute lifting forces and, thereby, allow the person to be hoisted while minimizing injuries. In some emergency situations, the person may be unconscious and/or injured and must be hoisted a substantial distance into a helicopter or rescue vehicle. In battlefield conditions, this task may be further complicated if the person to be hoisted is loaded with heavy or bulky equipment.

An example of a hoisting harness is illustrated in Published Patent Application 2007/0295555 to O'Rourke. O'Rourke discloses a hoisting harness that includes a saddle strap, two leg straps, and two shoulder straps. The shoulder straps have first and second ends. The first ends of the shoulder straps are attachable to the saddle strap ends. The second ends of the shoulder straps are attachable to the leg straps.

It is, therefore, an object of this invention to provide an improvement which overcomes the aforementioned inadequacies of the prior art devices by providing a harness for restraining and extracting a wearer. It is also an object to provide a harness that can be easily coupled and uncoupled from an external restraint system.

SUMMARY OF THE INVENTION

The disclosed system presents several important advantages over prior systems. For instance, the disclosed harness acts to both restrain and extract a crewmember.

The disclosed harness system also includes a release mechanism for allowing the user to be easily coupled to, or uncoupled from, an external restraint.

Another advantage of the disclosed system is the ability to protect and restrain an individual against sudden movements while at the same time providing an uncomplicated means for freeing the individual from the system.

Still yet another advantage of the disclosed system is to provide an integrated harness and vest, which together restrain an individual in the event of a vehicle accident.

Yet another advantage of the present system is to provide an integrated harness and vest wherein the release mechanism is at least partially routed between the harness and vest.

The present system also provides a combined restraint and extraction harness.

Various embodiments of the invention may have none, some, or all of these advantages. Other technical advantages of the present invention will be readily apparent to one skilled in the art.

The foregoing has outlined some of the pertinent objects of the invention. These objects should be construed to be merely illustrative of some of the more prominent features and applications of the intended invention. Many other beneficial results can be attained by applying the disclosed invention in a different manner or modifying the invention within the scope of the disclosure. Accordingly, other objects and a fuller understanding of the invention may be had by referring to the summary of the invention and the detailed description of the preferred embodiment in addition to the scope of the invention defined by the claims taken in conjunction with the accompanying drawings.

| PARTS LIST | |
|---|---|
| 20 | Harness |
| 22 | Vest |
| 24 | Front Panel of Vest |
| 26 | Back Panel of Vest |
| 28 | First Shoulder Strap |
| 32 | Second Shoulder Strap |
| 34 | Internal Opening Front |
| 36 | Internal Opening Back |
| 38 | Internal Opening Shoulder |
| 42 | Bottom Strap |
| 44 | Thigh Strap |
| 46 | Side Straps |
| 48 | Shoulder Straps |
| 52 | Chest Strap |
| 54 | Back Strap |
| 56 | Female Buckles Bottom Straps |
| 58 | Female Buckles Thigh Straps |
| 62 | Pockets Bottom Strap |
| 64 | Upper Ends Side Straps |
| 66 | Lower End Side Straps |
| 68 | Shackle Anchors |

-continued

PARTS LIST

| 72 | Male Buckles Side Straps |
|---|---|
| 74 | Pockets Side Straps |
| 76 | First End Shoulder Straps |
| 78 | Second End Shoulder Straps |
| 82 | Male Buckles Shoulder Straps |
| 84 | Male Buckles Back Straps |
| 86 | Rupture Seams |
| 88 | Female Buckles Chest Strap |
| 92 | Extraction Loops |
| 102 | Release Mechanism |
| 104 | Shackle |
| 106 | Shackle Housing |
| 108 | Lower Shackle Opening |
| 110 | Upper Closure |
| 112 | Plunger |
| 114 | Spring for Plunger |
| 116 | Trigger |
| 118 | Tether |
| 122 | Handle for Shackle |
| 124 | Hook and Pile for Handle |
| 126 | Cable |
| 128 | Cable Guide |
| 132 | Cable Guide Housing |
| 134 | Internal Passage Cable Guide |
| 136 | Slots in Cable Guide |
| 138 | Webbing for Cable Guide |
| 138 | First End of Cable |
| 142 | Second End of Cable |
| 144 | Sheath for Cable |
| 145 | Large Hook |
| 148 | Short Webbing |

BRIEF DESCRIPTION OF THE DRAWINGS

For a fuller understanding of the nature and objects of the invention, reference should be had to the following detailed description taken in connection with the accompanying drawings in which:

FIG. 8 is a detailed view of the shackle used in the release mechanism of the present disclosure.

FIG. 9 is a detailed view of the cable guide assembly.

FIG. 10 is a detailed view of pocket-in-pocket interconnection used in the harness.

Similar reference characters refer to similar parts throughout the several views of the drawings.

DETAILED DESCRIPTION OF THE PREFERRED EMBODIMENT

The present disclosure relates to a harness system that can be used in both restraining and extracting a wearer. The harness takes the form of webbing that may be integrated into a crewmember worn vest. The webbing includes extraction loops for use in hoisting the crewmember and a release mechanism for releasably coupling the harness to an external restraint, such as an overhead reel. The system can be used within a vehicle, such as a land based vehicle, a water going vessel, or an aircraft. The various components of the present invention, and the manner in which they interrelate, are described in greater detail hereinafter.

Harness Restraint and Extraction System

Figure 1A:
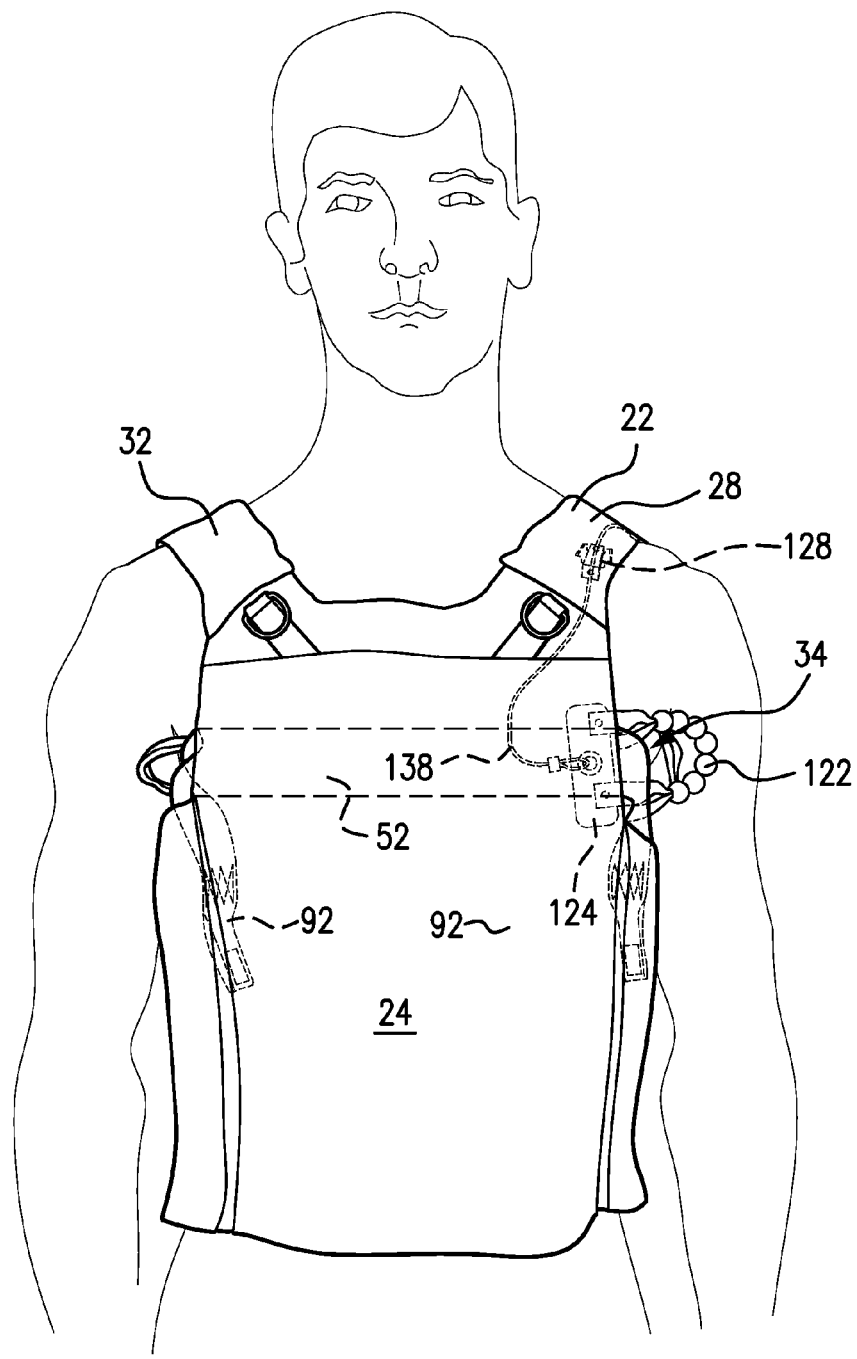
FIG. 1A is a front elevational view of the vest of the present disclosure.
Figure 1B:
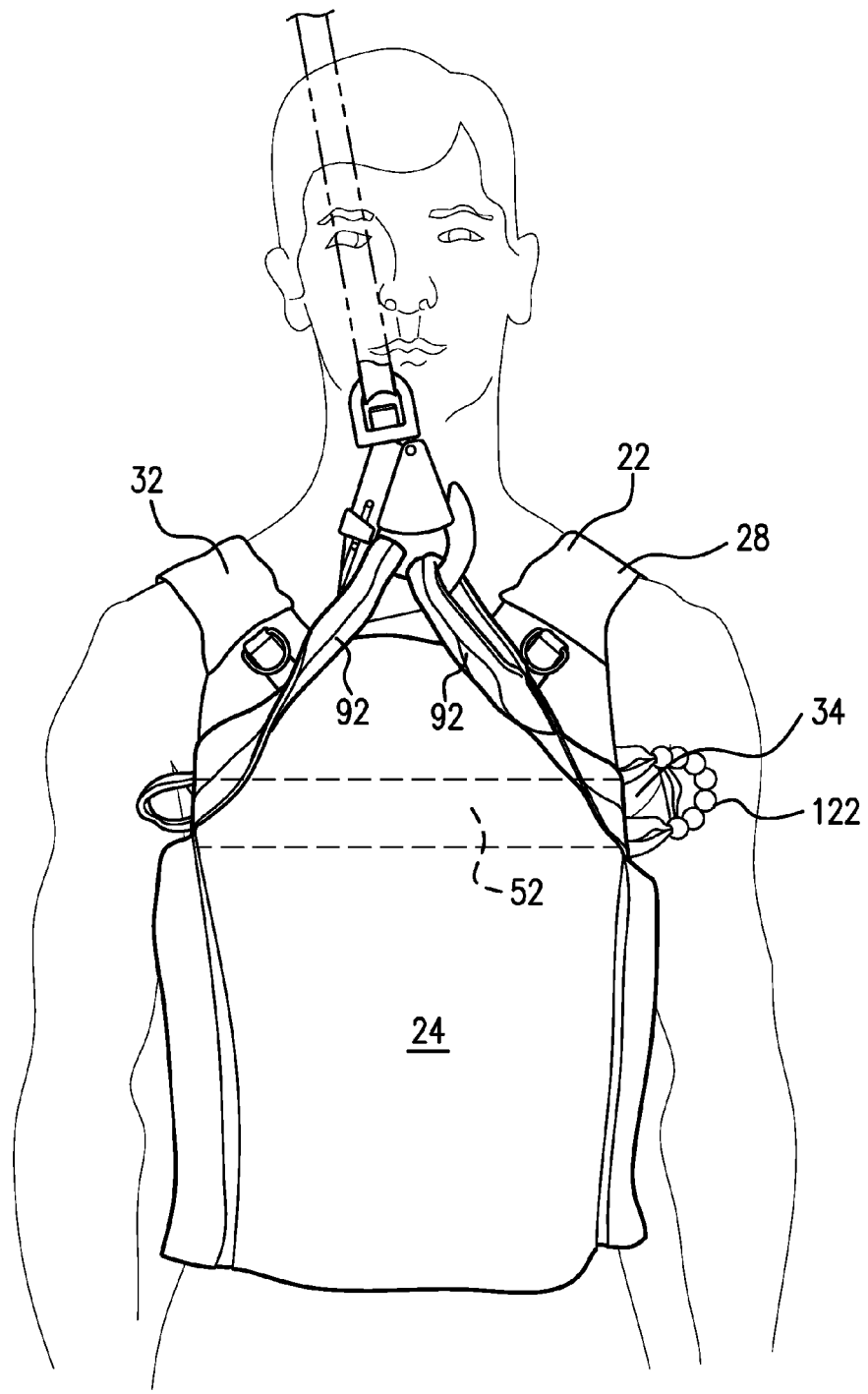
FIG. 1B is a front elevational view of the vest of the present disclosure with the crewmember being extracted.
Figure 2A:
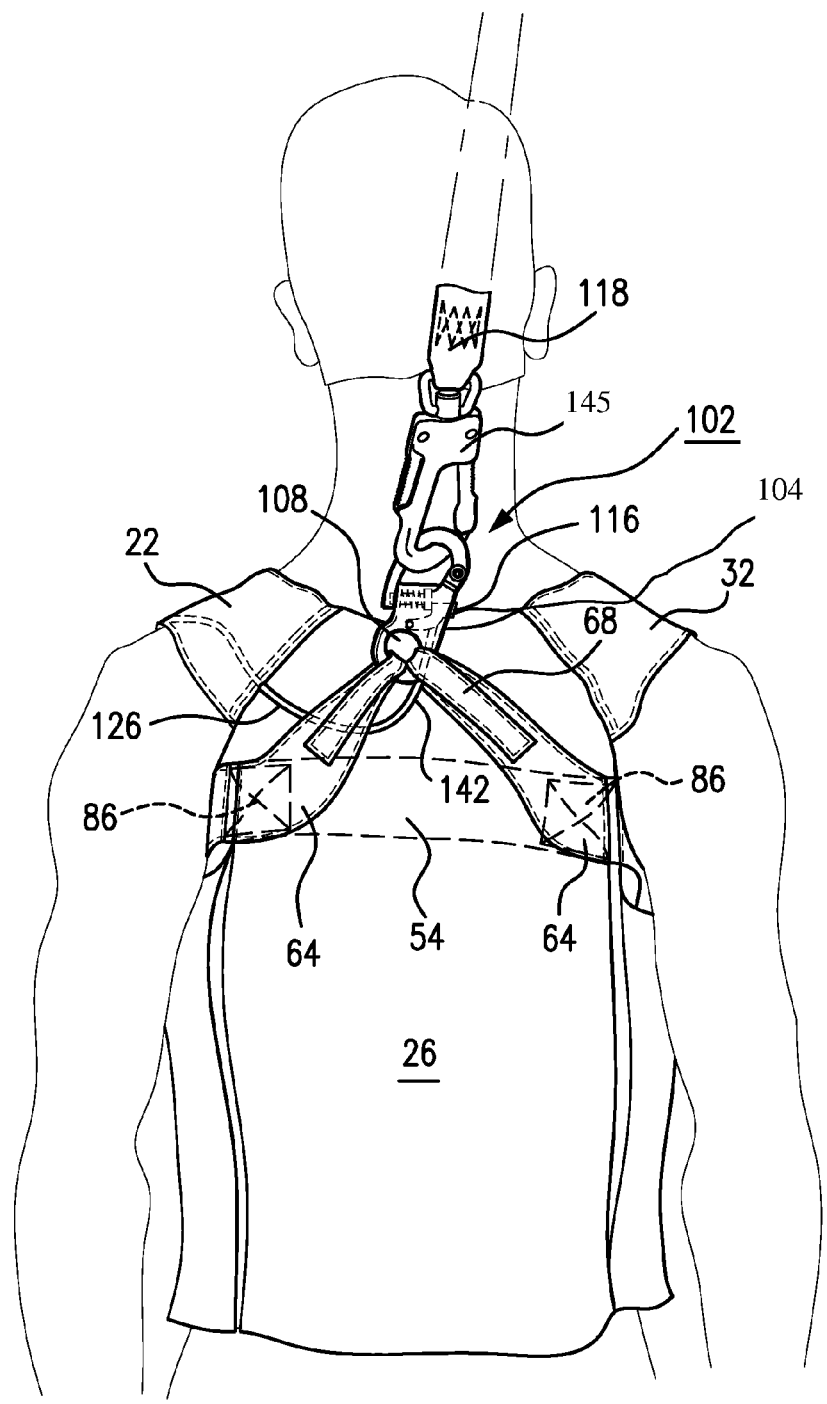
FIG. 2A is a rear elevational view of the vest of the present disclosure with the crewmember coupled to an overhead restraint system.
Figure 2B:
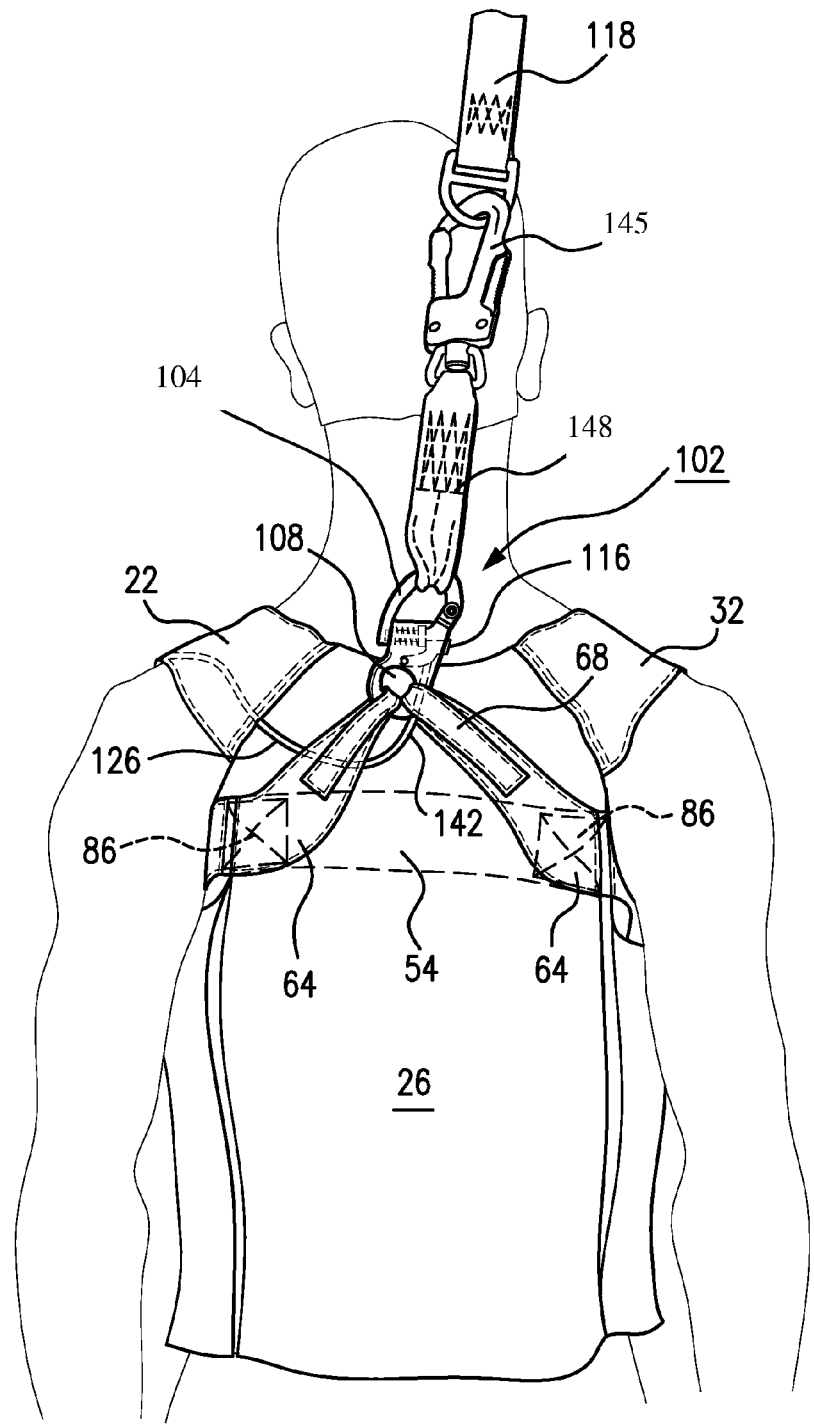
FIG. 2B is a rear elevational view of the vest of the present disclosure with the crewmember coupled to an overhead restraint system.
Figure 2C:
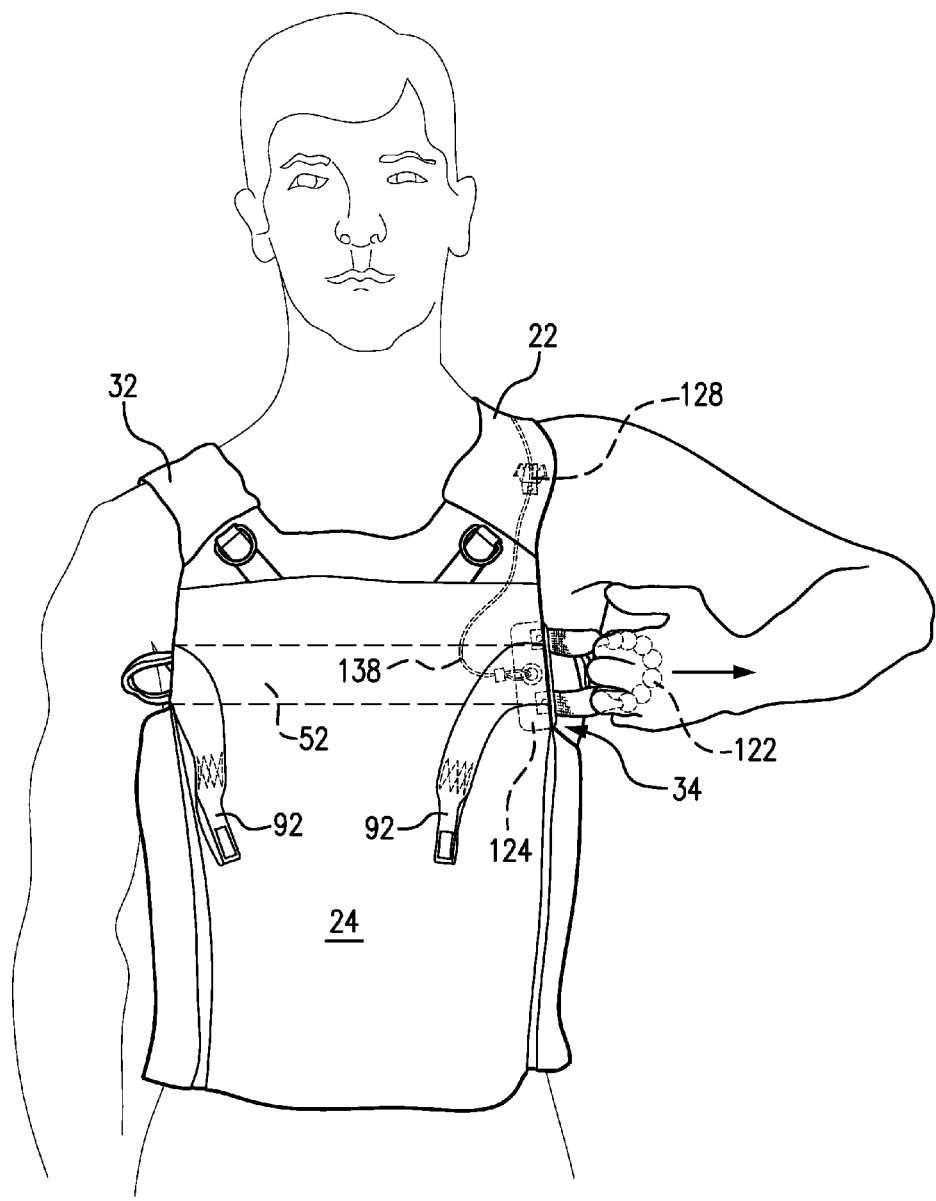
FIG. 2C is a front elevational view of the vest of the present disclosure with the crewmember activating the release mechanism.

The harness restraint 20 is included within a crewmember worn vest 22. As noted in FIGS. 1-2, vest 22 preferably includes front and back panels (24 and 26) and interconnected first and second shoulder straps (28 and 32). Side panels can also be incorporated between the front and back panels (24 and 26). Panels (24 and 26), straps (28 and 32), and side panels may all be integrally formed from a continuous piece of material, such as Nylon. Alternatively, vest 22 can be a cut-away style vest. Cut-away style vests are preferred because they permit the user to easily remove the vest without having to undue buckles or claps. This feature is preferred when vest 22 is used to carry heavy equipment. Cut-away vests include separable front and back panels and may include a cummerbund that extends from the rear panel and that is secured to the front panel by way of hook and pile fasteners. The front and back panels further include shoulder straps that likewise connect via hook and pile fasteners. An example of a cut-away style vest is disclosed in U.S. Patent Application 2002/0120973 to T. D. D'Annunzio.

Vest 22 also includes internal openings within front and back panels and the shoulder straps. More specifically, a front opening 34 is formed in front panel 24; a rear opening 36 is formed in back panel 26; and shoulder openings 38 are formed within shoulders 28 and 32. These internal openings take the form of interior pockets for housing restraint harness 20. An additional opening in the front panel 34 can be used to carry Kevlar armor, which can be secured via hook and pile fasteners. Additionally, small arms protective inserts (SAPIs) may be installed in separate pockets on the vest.

Figure 5:
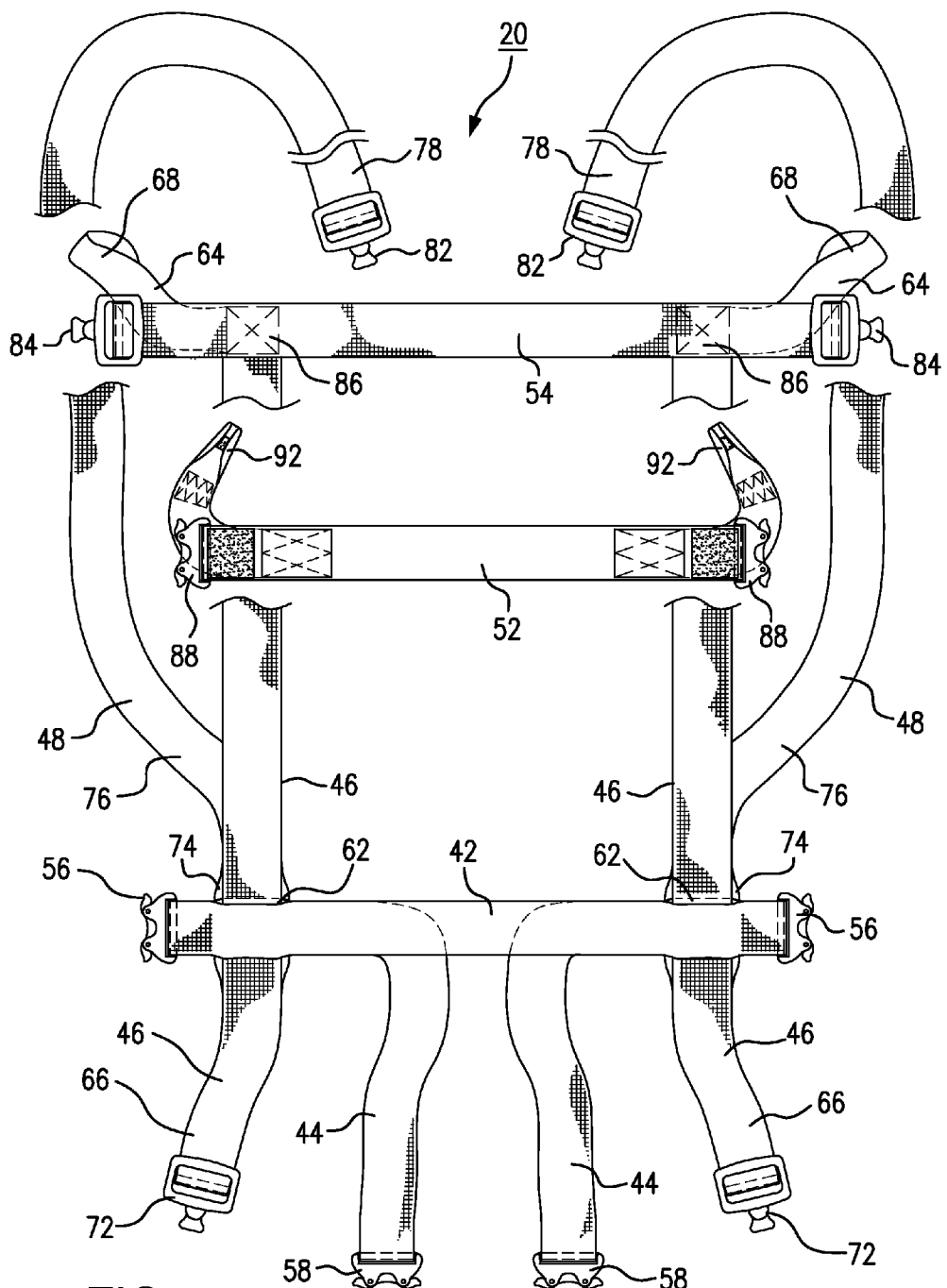
FIG. 5 is a plan view of the harness separated from the associated vest.

Restraint harness 20 of the present disclosure is best illustrated in FIG. 5. Harness 20 can be formed from lengths of interconnected nylon or polyester webbing. As noted above, portions of the webbing are positioned within the internal openings of the harness. However, other portions of harness 20 are disposed outside of vest 22. For example, harness 20 includes a bottom strap 42 that is positioned below vest 22 and which extends across the buttocks of the crewmember. Thigh straps 44 extend down from bottom strap 42 and are adapted to extend around the legs of the crewmember. Side straps 46 run up the back of the crewmember and within the back opening 36. Shoulder straps 48 are likewise positioned within back opening 36 and extend through shoulder strap openings 38 and down into the front opening 34. A chest strap 52 is secured within front opening 34 and is coupled to a back strap 54 within the back opening 36. Together these straps form a harness 20 that surrounds the crewmember and facilitates restraint and extraction.

As noted in FIG. 5, a bottom strap 42 includes opposing ends and an intermediate extent. Female buckles 56 are secured at the opposing ends of strap 42. As noted more fully hereinafter, the opposing ends of bottom strap 42 are secured to opposite sides of shoulder straps 48. Thigh straps 44 and bottom strap 42 are ideally formed as a continuous piece of webbing. Female buckles 58 are secured to the distal ends of thigh straps 44. In the preferred embodiment, pockets 62 are formed within bottom strap 42 at a location immediately adjacent the opposing ends. Pockets permit bottom strap 42 to flexibly interconnect with side straps 46.

With continuing reference to FIG. 5, harness 20 ideally includes two side straps 46 that extend up the back of the wearer. Each side strap 46 includes upper and lower ends (64 and 66). Upper ends 64 of side straps 46 are formed into loops or shackle anchors 68. These shackle anchors 68 are used in securing a shackle as noted hereinafter. Male buckles 72 are secured at the lower ends 66 of the side straps 46. Pockets 74 are formed within side straps 46 proximate to lower ends 66. Pockets are identical in construction to pockets 62 formed within bottom strap 42. As illustrated, pockets 74 within side straps 46 engage pockets 62 of the bottom strap 42. This pocket-in-pocket connection allows the bottom and side straps (42 and 46) to be securely joined together while at the same time allowing a limited degree of movement. A detailed view of the pocket-in-pocket connection is shown in FIG. 10.

Harness 20 is secured to the upper thighs of the crewmember by way of the side straps and thigh straps (46 and 44). Namely, the side and thigh straps (46 and 44) are wrapped around the legs of the crewmember and fastened together via the male and female buckles (72 and 58).

Figure 6:
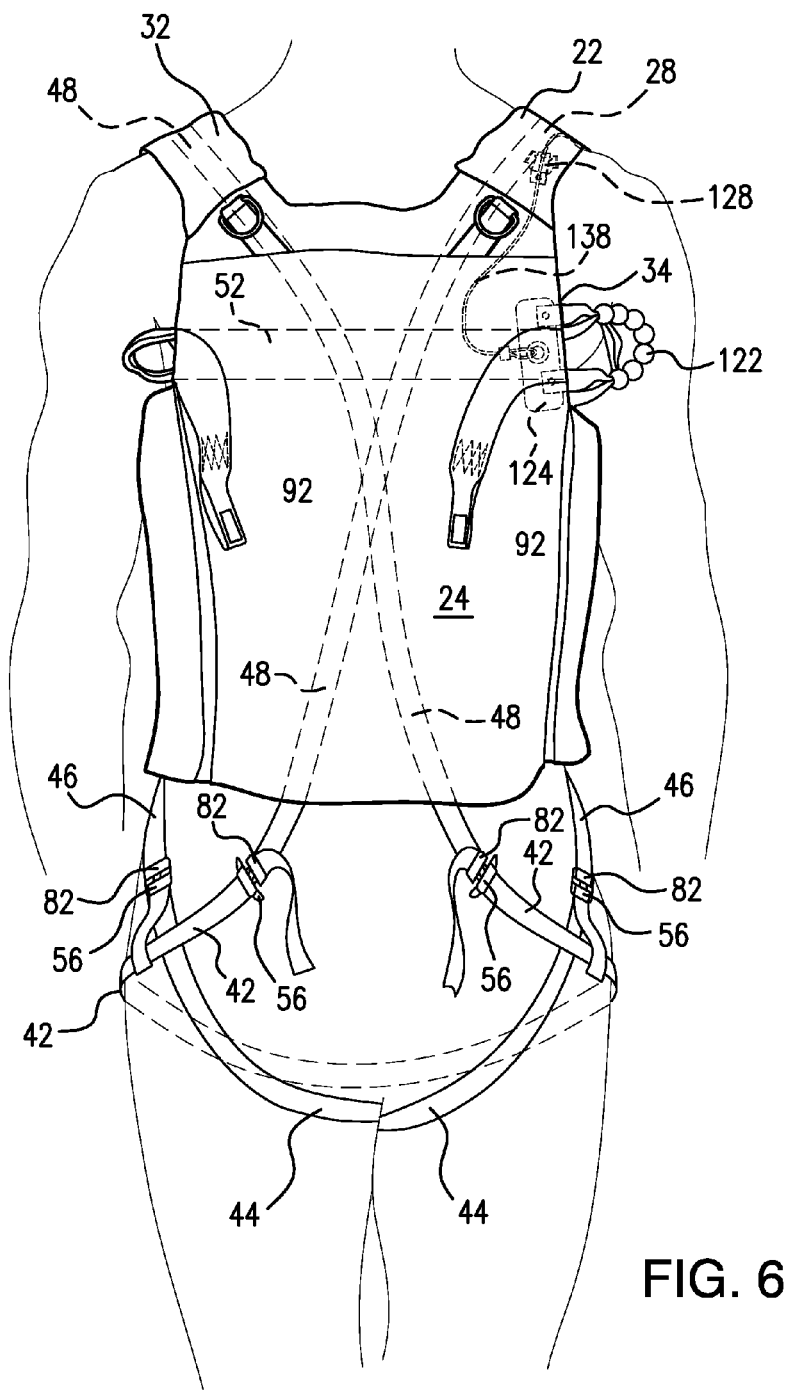
FIG. 6 is a front elevational view of the restraint system of the present disclosure.

Harness 20 further includes two shoulder straps 48. Each shoulder strap 48 includes a first end 76 that is secured to an intermediate extent of a corresponding side strap 46 and a second or distal end 78. A male buckle 82 is secured to the second end 78 of each shoulder strap 48. In use, the intermediate extent of each shoulder strap 48 is adapted to be positioned over the shoulder and across the chest of the crewmember. As noted in FIG. 6, after the shoulder straps 48 cross the chest of the crewmember, the male buckles 82 are secured to the female buckles 56 of bottom strap 42.

Harness 20 likewise includes interconnected chest and back straps (52 and 54). Back strap 54 is positioned within back opening 36 and includes male buckles 84 at opposing ends. The opposing ends of the back strap 54 are also secured to the upper extends 64 of the side straps 46 proximate shackle loops 68. In the preferred embodiment, side straps 46 are joined to back strap 54 via rupturable seams 86. For example, the straps can be joined with a seam 86 that is designed to break when forces in excess of 1,000 lbs are encountered. This prevents the crewmember's chest and back from encountering excessive forces in the event of a crash or excessive vehicle movements. Upon encountering excessive forces, seam 86 breaks, where after forces are transferred to the crewmember's waist and legs via the side straps 46, bottom strap 42, and thigh straps 44.

Finally, chest strap 52 resides within the internal compartment 34 of front panel 24. Chest strap 52 has opposing ends with female buckles 88. These female buckles 88 are designed to accept the male buckles 84 from back strap 54. Additionally, extraction loops 92 are integrally formed along the intermediate extent of chest strap 52. As noted in FIG. 1B, these extraction loops 92 allow the crewmember to be extracted via a winch or hoist. This may be necessary if the crewmember becomes incapacitated and must be lifted. Harness 20 is structured such that the lifting forces of the hoist are equally distributed over the webbing to thereby avoid injuring the crewmember upon extraction. Extraction loops 92 can be tucked into the front opening 34 when not in use.

Release Mechanism

Figure 3:
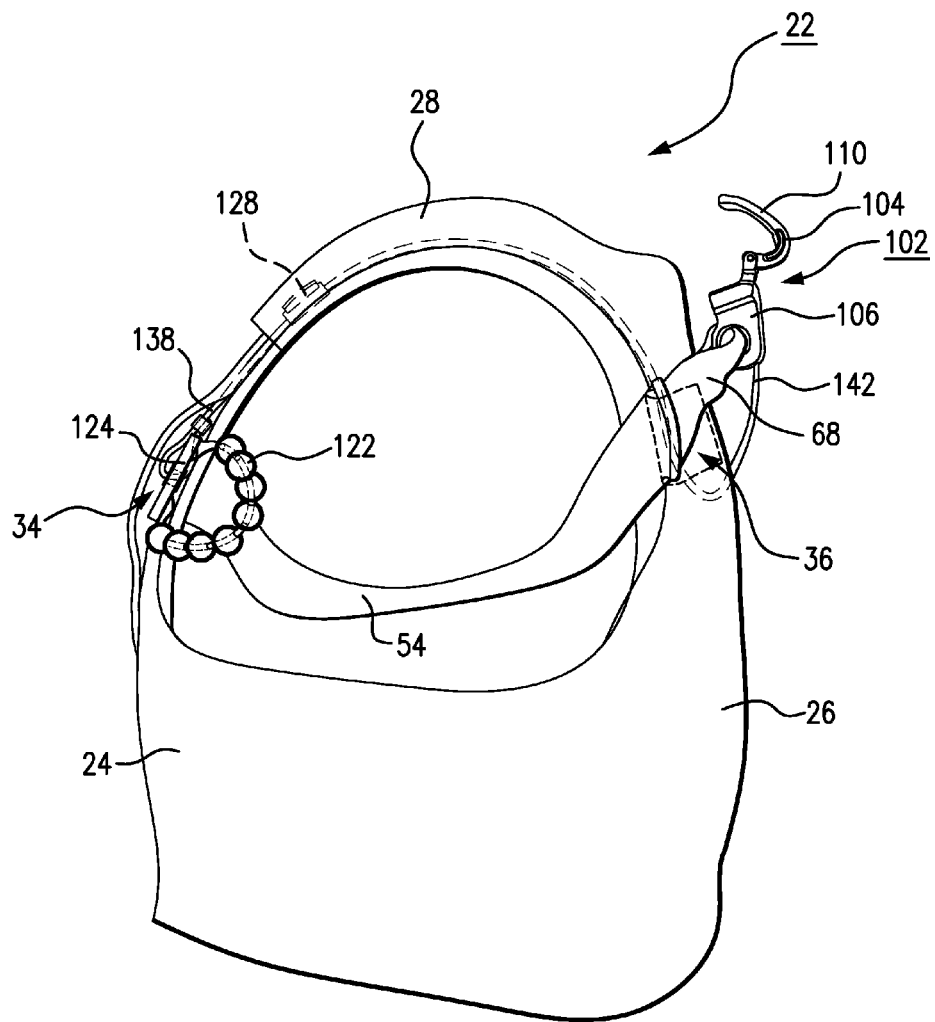
FIG. 3 is a side elevational view of the release mechanism of the present disclosure.
Figure 4:
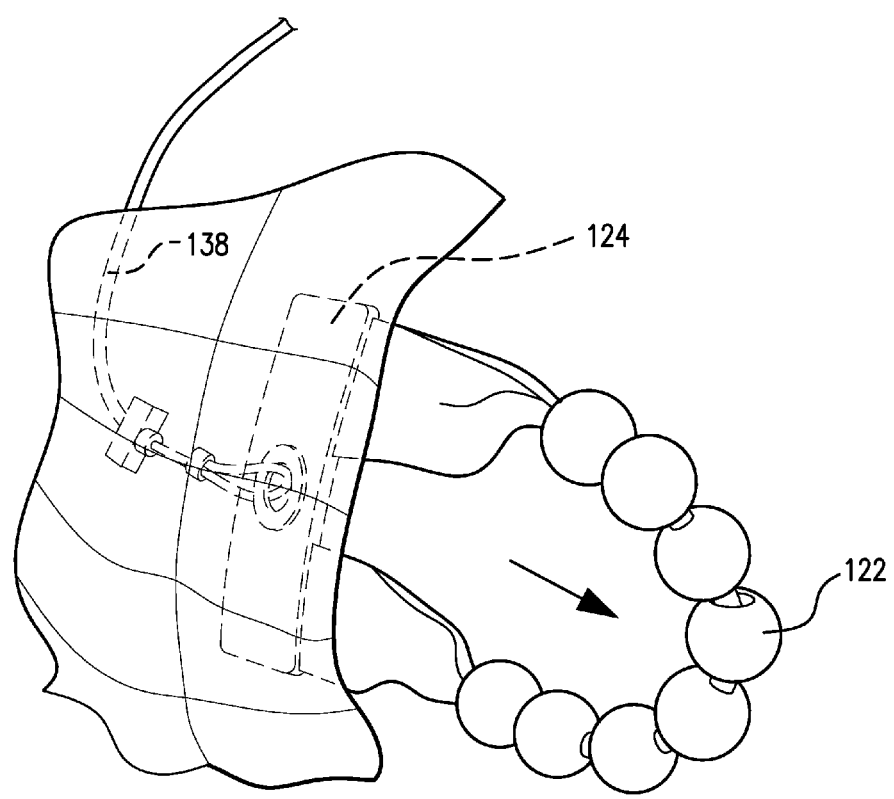
FIG. 4 is a detailed view of the handle of the release mechanism.

The present disclosure also relates to release mechanism 102 for use in securing harness 20 and vest 22 to an external restraint (note FIG. 3). Release mechanism 102 includes a shackle 104 for releasably coupling the harness restraint 20 to the external restraint, which can be, for example, an overhead reel or a fixed anchor point within the vehicle. The preferred shackle 104 of the present disclosure is depicted in FIG. 8. Shackle 104 includes a housing 106 with a lower opening 108. Opening 108 permits shackle 104 to be joined to the shackle anchors 68 formed by the upper ends 64 of side straps 46. Shackle 104 also includes an upper closure member 110. As depicted, closure member 110 is pivotally connected to shackle housing 106.

Closure 110 is retained in a closed orientation by way of a spring biased plunger 112. Plunger 112 includes a spring 114 that biases plunger 112 to an extended position. In the extended position, plunger 112 extends into an corresponding opening within the pivotal closure member 110. In the preferred embodiment, plunger 112 is inclined at an angle relative to a horizontal axis. This angle reduces the forces encountered by closure 110, which in turn, reduces the possibility of an unintended release. Shackle 104 also includes a trigger 116 having an engaged orientation whereby plunger 112 is retracted to allow the upper closure 110 to open. Shackle 104 can be opened to accept a tether 118 from the external restraint. As noted in FIG. 2A, shackle 104 can be coupled to tether 118. Tether 118 includes a hook 145 rotatably mounted at its end that can be releasably attached to shackle 104. Alternatively, as noted in FIG. 2B, shackle 104 can be coupled to tether 118 via a short length of webbing 148. Webbing 148, in turn, is coupled to a D-ring via hook 145.

Figure 7:
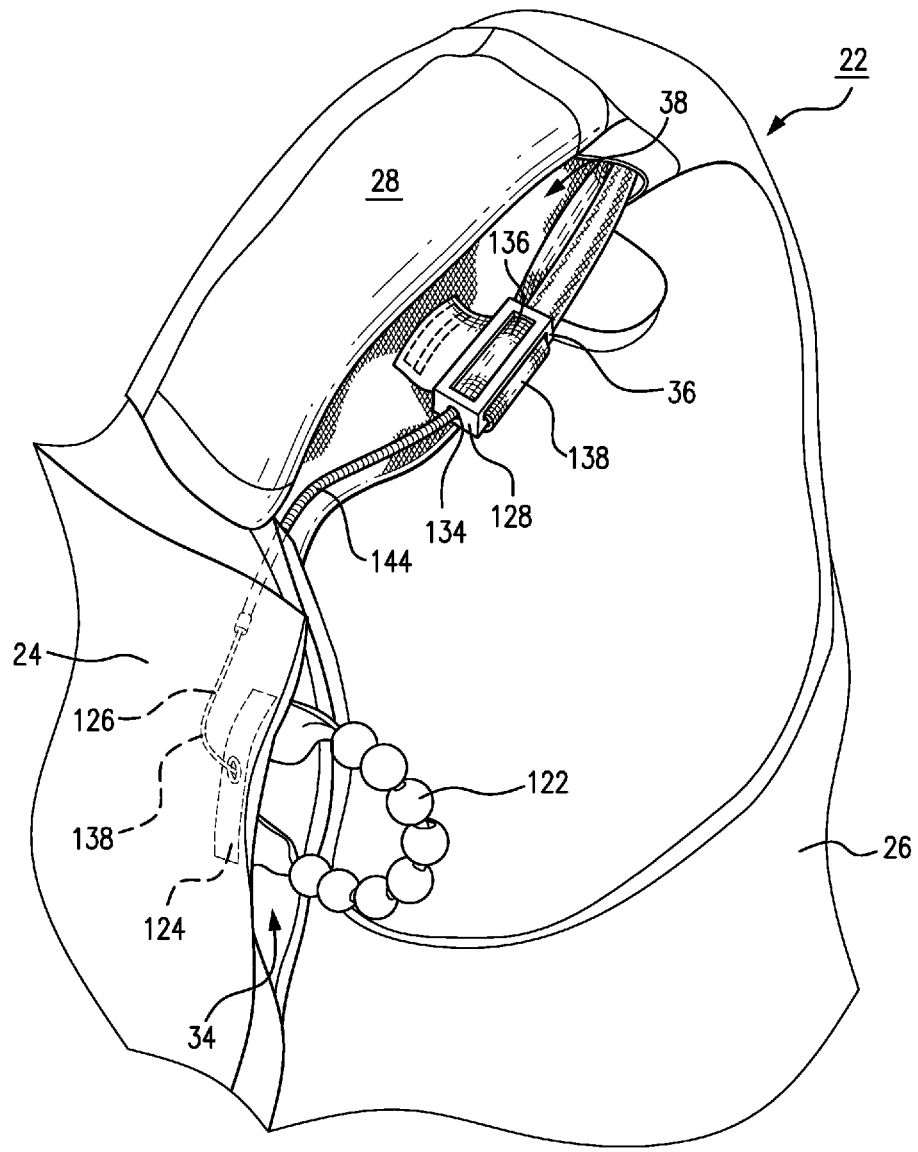
FIG. 7 is a detailed view showing the restraint cable being routed through the vest shoulder.

Shackle 104 can be released by way of a handle 122 that is positioned for easy access by the user. In the preferred embodiment, handle 122 is positioned in the front opening 34 of vest 22 (note FIG. 7). Handle 122 may include hook and pile fasteners 124 for the purpose of retaining handle 122 secured to mating hook and pile fasteners within opening 34. This keeps handle 122 in place until it is needed by the user. Handle 122 is connected to shackle trigger 116 by a length of cable 126.

Vest 22 includes one or more internal cable guides 128. In the depicted embodiment, a single cable guide 128 is included within the opening 38 of the first shoulder strap 28. As noted in FIG. 9, cable guide 128 includes an elongated housing 132 with an internal cylindrical passage 134. Slots 136 are formed within housing 132 and about the cylindrical passage 134. A short length of webbing 138 is threaded through slots 136 to anchor cable guide 128 to the harness 20.

Cable 126 used in the release mechanism includes first and second ends (138 and 142) and an intermediate extent. A plastic sheath or coating 144 is preferable on the cable 126 to reduce wear. The first end 138 of cable 126 is secured to handle 122, while the second end 142 of cable 126 is secured to trigger 116 of shackle 104. In the preferred embodiment, second end 142 of cable 126 is inserted through trigger 116 such that downward movement of cable 126 brings trigger 116 into the engaged orientation to release closure 110. The intermediate extent of cable 126 is routed through the front panel opening 34, and through the internal shoulder opening 38 via cable guide 128.

In use, the crewmember can pull on cable 126 by accessing handle 122 from the front of vest 22. Pulling on cable 126 pulls down on, and engages, trigger 116. This action, in turn, retracts plunger 112 against bias of spring 114 to permit closure 110 to pivot to an opened position. This allows tether 118 to be uncoupled from shackle 104 and frees the crewmember from the external restraint. Importantly, all this can be accomplished without the crewmember having to reach behind to access shackle. Additionally, in the event the crewmember becomes suspended from tether 118, pulling handle 122 will allow the shackle 104 to be released by the crewmember's weight.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention.

Now that the invention has been described,

What is claimed is:

1. A release mechanism comprising:
   a vest including front and back panels and interconnected first and second shoulder straps;
   a restraint webbing secured within the front and back panels, the restraint webbing extending through the back panel of the vest and including a respective shackle loop proximate each shoulder strap;
   a shackle having a first end fixedly interconnected to the shackle loops, the shackle further including a second end having an upper closure member selectively movable from a closed position to an open position;
   a handle positioned within the front panel of the vest; and
   a cable having first and second ends and an intermediate extent, the first end of the cable secured to the handle, the second end of the cable secured to the shackle;
   whereby the cable can be pulled by way of the handle to move the upper closure member to the open position.

2. The release mechanism as described in claim 1 further comprising a sheath positioned over the intermediate extent of the cable.

3. A release mechanism comprising:
   a vest including front and back panels and interconnected first and second shoulder straps;
   a restraint webbing secured within the front and back panels, the restraint webbing extending through the back panel of the vest and including a pair of shackle loops;
   a shackle interconnected to the shackle loops, the shackle including an upper closure member selectively movable from a closed position to an open position, the shackle further including a housing and a spring biased plunger biased to extend from the housing and secure the upper closure;
   a handle positioned within the front panel of the vest; and
   a cable having first and second ends and an intermediate extent, the first end of the cable secured to the handle, the second end of the cable secured to the shackle;
   whereby the cable can be pulled by way of the handle to open the closure.

4. The release mechanism as described in claim 3 wherein the plunger is inclined at an angle relative to a horizontal axis.

5. The release mechanism as described in claim 3 further comprising a trigger having an engaged orientation whereby the plunger is retracted to allow the upper closure to open.

6. A release mechanism comprising:
   a vest including front and back panels and interconnected first and second shoulder straps;
   a restraint webbing secured within the front and back panels, the restraint webbing extending through the back panel of the vest and including a respective shackle loop proximate each shoulder strap;
   a shackle interconnected to the shackle loops, the shackle further including an upper closure member selectively movable from a closed position to an open position;
   a handle positioned within the front panel of the vest;
   a cable having first and second ends and an intermediate extent, the first end of the cable secured to the handle, the second end of the cable secured to the shackle; and
   a cable guide having an elongated housing with a cylindrical passage, slots formed within the housing and about the cylindrical passage, a length of webbing threaded through the slots and anchoring the cable guide within the vest
   whereby the cable can be pulled by way of the handle to move the upper closure member to the open position.

\* \* \* \* \*